United States Patent Office 2,767,848
Patented Oct. 23, 1956

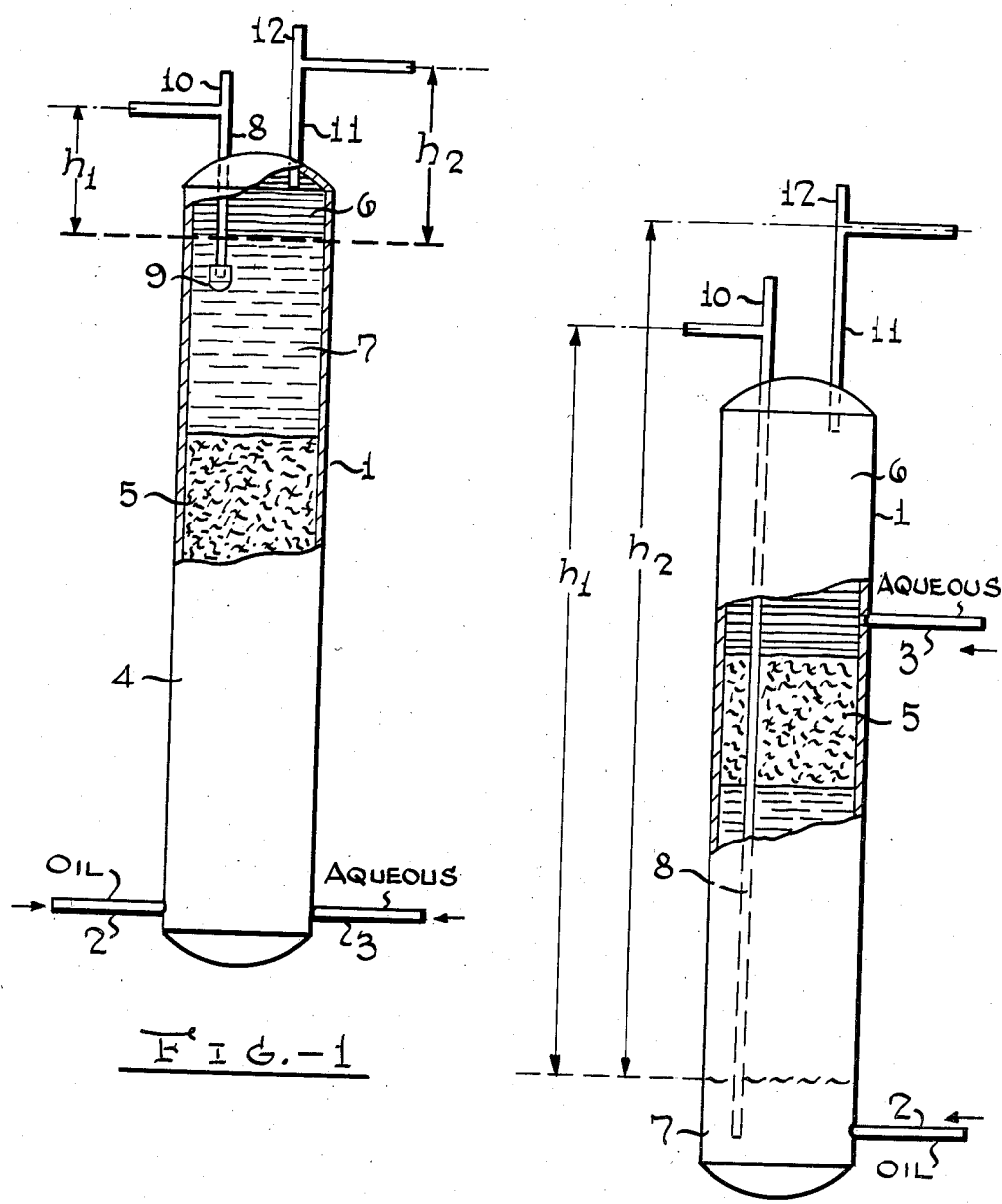

2,767,848

APPARATUS FOR CONTINUOUS WITHDRAWAL OF IMMISCIBLE LIQUID PHASES FROM A SETTLING ZONE

Frederick James Beckett, Milton, England, assignor to Esso Research and Engineering Company, a corporation of Delaware Application May 24, 1952, Serial No. 289,927

Claims priority, application Great Britain July 30, 1951

3 Claims. (Cl. 210—51)

This invention relates to an apparatus for allowing the continuous withdrawal of separate phases of immiscible liquids which have previously been contacted and allowed to settle.

It is frequently necessary in petroleum refining practice to contact a liquid hydrocarbon, such as naphtha or oil, with an immiscible aqueous phase, especially with aqueous solutions of alkalis, acids or inorganic salts and also with water alone. This process usually involved bringing together the two streams to be contacted, maintaining the phases in intimate contact for a suitable period of time, and withdrawing separately a treated hydrocarbon phase and an aqueous phase from the system. It is generally desirable that this operation be continuous. In order that two separate phases may be withdrawn from such a system it is necessary to have some kind of settling zone wherein a gravity separation occurs between the phases and to withdraw streams at two points, one above and one below the interfacial level between the phases. One of the major operating difficulties occurring in practice is the control of this interfacial level. Such control usually necessitates very close regulation of the relative rates of flow of the two liquid streams through the system, and has frequently been achieved by means of automatic devices of the "liquid level controller" type. The use of such devices, especially with small-scale treating operations, will clearly contribute undesirably to the expense and elaboration of the equipment.

It is an object of the present invention to provide apparatus which will enable the separate phases of two immiscible liquids which have previously been contacted and allowed to settle to be continuously withdrawn while the interfacial level of the two phases in the settling zone is maintained substantially constant despite fluctuations and variations of the flow rates.

According to the present invention, a settling zone is provided with two draw-off pipes each having an upper discharge point above the top of the settling zone and a lower liquid entry point within the said settling zone, the discharge points being adapted to be maintained at a common pressure. Each discharge point is at a distance above a desired liquid-liquid interfacial level inversely proportional to the density of the liquid each is to withdraw from the settling zone.

The entry point of the draw-off line for the lighter liquid must be arranged above the desired liquid-liquid interface and the entry point for the heavier liquid must be below this level. In order to prevent droplets of the lighter liquid rising into the entry point of the withdrawal pipe for the heavier liquid the entry point of that pipe is preferably fitted with a shroud or other baffle or may be bent back upon itself.

As stated above, the discharge points of the two withdrawal pipes are adapted to be maintained at a common pressure. This may most conveniently be achieved by venting both pipes to the atmosphere at these points, but alternatively they may be made to communicate to some common on-closed vapour space or may merely be joined together by means of a conjoining tube.

The mixture of the two liquids may be introduced into the settling zone from a separate contacting vessel at a point at or near the base of the settling vessel equipped according to this invention. In a preferred embodiment of the invention however, the contacting zone is an integral part of the equipment. In one embodiment of the present invention, the two liquids to be contacted are introduced near the base of the vessel and pass concurrently upwardly through a contacting zone where they are agitated together, then through a central packed section which helps the two liquids to separate, and thence to the upper settling zone fitted with the draw-off pipes described.

Referring to the drawings:

Figure 1 is a view, partly in section, illustrating one form of the invention in which a hydrocarbon is treated co-currently with an aqueous reagent.

Figure 2 is a view, partly in section, illustrating another form of the invention in which a hydrocarbon is treated countercurrently with an aqueous reagent.

The apparatus of Figure 1 comprises a vertical cylindrical column 1 to which an oil stream 2 and aqueous stream 3 are continuously fed at its lower end. The liquids flow together through a contacting zone 4 in which they are mixed together either by injecting the oil through a nozzle or by mechanical agitation or otherwise.

Above the contacting zone 4 is situated a packed section 5 which serves to collect and coalesce the oil droplets from the contacting zone and hence to aid their separation from the aqueous phase.

Above the packed section is the settling zone in which the oil and water settle to give an upper oil phase 6 and a lower water phase 7. The draw-off pipe for the water phase 8 has its water entry below the oil-water interphase and is fitted with a shroud 9 to prevent the entry of rising oil droplets into the pipe 8. The discharge point of the pipe 8 is at a height $h_1$ above the oil-water interface and is vented to the atmosphere by means of extension 10.

The withdrawal pipe for the oil 11 has its oil entry above the oil-water interface and its discharge point at a height $h_2$ above the oil-water interface and is also vented to the atmosphere by means of extension 12.

The heights $h_1$ and $h_2$ are chosen such that $$\frac{h_1}{h_2} = \frac{D_o}{D_w}$$

where $D_o$ and $D_w$ are respectively the densities of the oil and aqueous reagent used.

When the relative flow rates of either the oil or aqueous reagents change there is a tendency for the oil-water interface to change, but any slight change in this level alters the pressures at the discharge ends of the withdrawal pipes and causes the outflow rates of either phase to adjust themselves in such a way as to cause the oil-water interface to revert to its normal position. In practice it has been found that relatively large changes in flow rates can be tolerated with substantially no change in the interfacial level.

Turning now to Figure 2, the apparatus also comprises a vertical cylindrical column 1 into which an oil stream 2 and aqueous stream 3 are continuously fed. The aqueous phase flows downwardly and the oil phase flows upwardly, the two phases being intimately contacted as they pass a packed section 5.

The oil tends to settle into an upper oil phase 6 located at the upper part of the column while the water settles into a lower water phase 7. The draw-off pipe for the water phase 8 has its water entry below the oil-water interphase and has its discharge point at a height $h_1$ above the oil-water interface. At the discharge point, it is vented to the atmosphere by means of extension 10.

The withdrawal pipe for the oil 11 has its oil entry above the oil-water interface and its discharge point at a height $h_2$ above the oil-water interface and is also vented to the atmosphere by means of extension 12.

The heights $h_1$ and $h_2$ are chosen such that $$\frac{h_1}{h_2} = \frac{Do}{Dw}$$

where $Do$ and $Dw$ are respectively the densities of the oil and aqueous reagent used.

As in the first embodiment illustrated, when the relative flow rates of either the oil or aqueous reagents change there is a tendency for the oil-water interface to change, but any slight change in this level alters the pressures at the discharge ends of the withdrawal pipes and causes the outflow rates of either phase to adjust themselves in such a way as to cause the oil-water interface to revert to its normal position.

What I claim is:

1. An apparatus for the separation of two immiscible liquids of different specific gravities while maintaining a liquid interface therebetween at a constant level comprising in combination a contacting vessel, a heavy liquid draw-off pipe having an upper discharge point above the top of said vessel and extending into and terminating at a point within said vessel, a light liquid draw-off pipe having an upper discharge point positioned above said heavy liquid draw-off pipe upper discharge point and terminating at a point within said vessel above the termination point of said heavy liquid draw-off pipe, said respective upper discharge points and said lower termination points being spaced such that the ratio of the height of the upper discharge point of said heavy liquid draw-off point above the liquid interface to the height of the upper discharge point of said light liquid draw-off point above said interface is inversely proportional to the ratio of the specific gravity of said heavy liquid to said light liquid.

2. Apparatus according to claim 1, including a contacting zone for contacting said liquids integral with a settling zone.

3. Apparatus according to claim 1 wherein the upper discharge point of each draw-off pipe is vented to the atmosphere.

References Cited in the file of this patent

UNITED STATES PATENTS

| | | |
|---|---|---|
| 654,965 | Franke | July 31, 1900 |
| 679,575 | Reese | July 31, 1901 |
| 1,159,044 | Kelly | Nov. 2, 1915 |
| 1,513,882 | Bateman | Nov. 4, 1924 |
| 1,557,103 | Smith | Oct. 13, 1925 |
| 1,825,550 | Schulte | Sept. 29, 1931 |
| 1,838,029 | Isles | Dec. 22, 1931 |
| 1,946,415 | Schmid | Feb. 6, 1934 |
| 1,947,709 | Garrison et al. | Feb. 20, 1934 |
| 1,968,131 | Edwards | July 31, 1934 |
| 2,077,057 | Poole | Apr. 13, 1937 |
| 2,224,624 | Adams et al. | Dec. 10, 1940 |
| 2,258,982 | Gordon et al. | Oct. 14, 1941 |
| 2,405,158 | Mensing | Aug. 6, 1946 |
| 2,420,115 | Walker et al. | May 6, 1947 |
| 2,610,698 | Lovelady et al. | Sept. 16, 1952 |
| 2,619,187 | Hayes et al. | Nov. 25, 1952 |

OTHER REFERENCES

Lemon, et al.; Analytical Experimental Physics, pp. 131 and 144, University of Chicago Press, 1943.